United States Patent Office 3,415,114
Patented Dec. 10, 1968

3,415,114
DYNAMIC ENGINE ANALYZER
Gale W. Crampton, Des Plaines, and Howard J. Fremont, Chicago, Ill., assignors to Atlantic Licensing Corporation, a corporation of Illinois
Filed Nov. 23, 1966, Ser. No. 596,551
9 Claims. (Cl. 73—117.2)

ABSTRACT OF THE DISCLOSURE

An internal combustion engine analyzer in which electrical pulses representative of the intake or exhaust pressure fluctuations are compared with an "ideal" pulse train derived from the ignition system fluctuations.

---

This invention relates to a system for analyzing the condition of an internal combustion engine, and more particularly, to an analyzing system which compares the actual dynamic performance of an internal combustion engine with an ideal performance characteristic.

The analyzing system of the present invention can be used with any internal combustion engine having an electrical induction system, an intake manifold and an exhaust manifold. A first train of electrical current pulses is derived from the pressure pulses in at least one of the manifolds. A second train of current pulses is derived from the induction system in synchronism with the first train of pulses, and is generated by means of appropriate circuitry, to form an "ideal" pulse train. Each of the pulses of the first train is compared with the respective "ideal" pulse, and problems in the internal combustion engine under test are indicated by the resulting differential output.

In the illustrative embodiment of the invention, a pressure sensitive transducer is connected to the intake manifold in order to obtain electrical pulses representative of the negative pressure condition within the intake manifold, and a pressure sensitive transducer is connected to the exhaust manifold, in order to obtain electrical pulses representative of the positive pressure condition within the exhaust manifold. The pulses from the intake and exhaust manifolds are compared with a series of reference pulses which are derived from the distributor after suitable pulse shifting and forming and are generated and modified pursuant to an "ideal" pulse formation, in synchronism with the firing of the spark plugs. The modification of the pulses derived from the distributor is such that, if the engine under test is operating properly, the addition of each of the pulses derived from the manifolds with each of the respective ideal pulses derived from the distributor will create a substantially zero output—that is, the pulses will substantially cancel each other out. If such cancellation does not occur, this will indicate that the engine under test is not functioning properly.

A more detailed explanation of the invention is provided in the following description and claims, and is illustrated in the accompanying drawings, in which:

Figure 1:
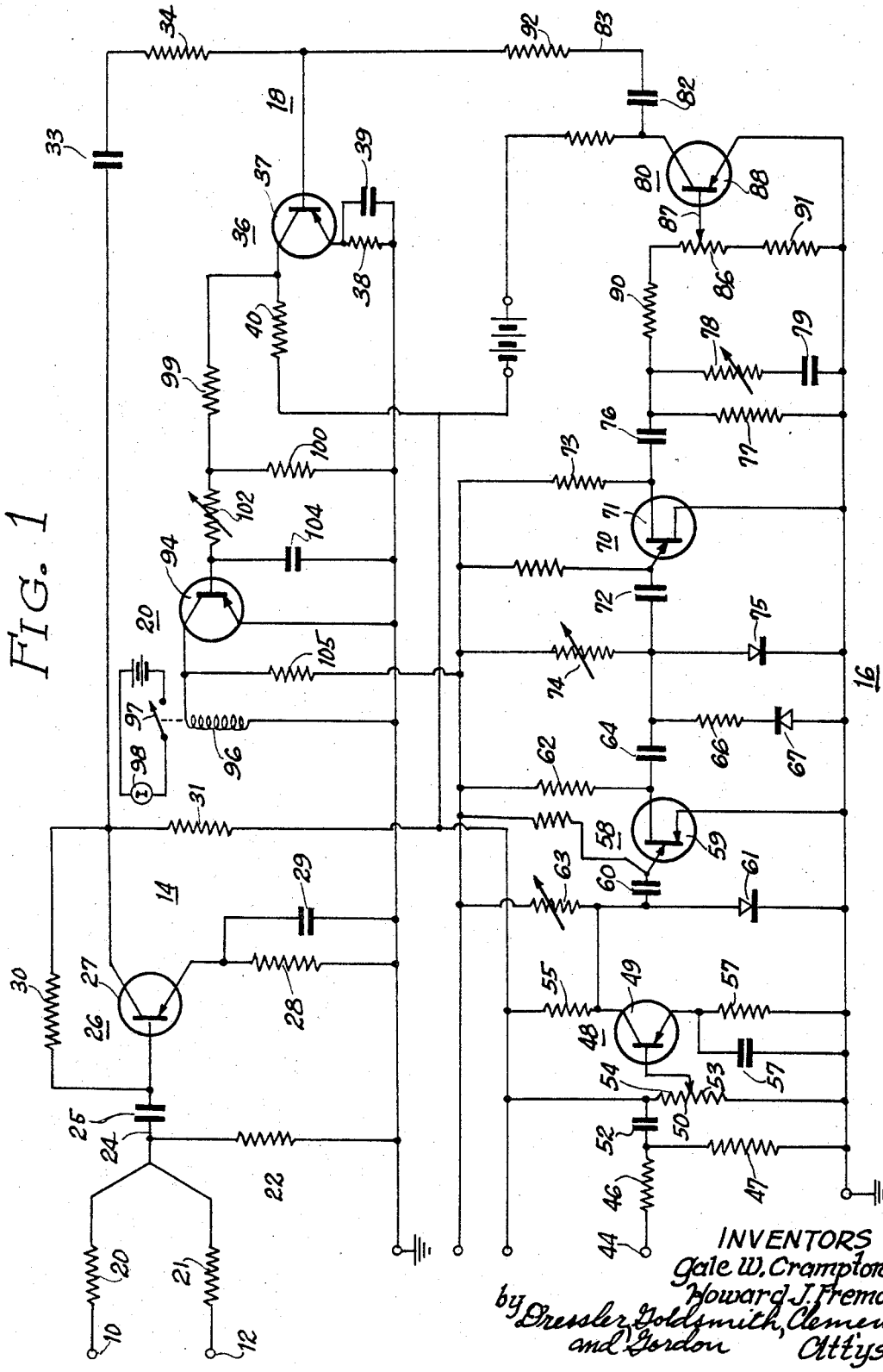
FIGURE 1 is a schematic circuit diagram of a dynamic engine analyzing system in accordance with the principles of the present invention.

The illustrated system basically includes sensing transducers 10 and 12, a mixing and amplifying circuit 14, a reference pulse train generating circuit 16, a comparing circuit 18 and an output circuit 20.

The transducers 10 and 12 are a type sensitive to pressure. Such transducers are sold by Consolidated Controls Corporation of Bethel, Conn., under Model No. 41GP1. The pressure sensor portion of the Model 41GP1 pressure transducer is of the linear variable differential transformer type. Pressure is sensed by a diaphragm, and a magnetic stainless core attached to the sensing device moves linearly within the differential transformer with changes in pressure. The AC signal resulting from this linear displacement is amplified and demodulated to provide a high level DC voltage proportional to pressure.

Pressure sensitive transducer 10 is connected to the intake manifold of the internal combustion engine under test, and the pressure sensitive transducer 12 is connected to the exhaust manifold. Each cylinder stroke will be preceded by a discrete negative pressure analog of the intake valve opening condition in the intake manifold and will be followed by a discrete positive pressure analog of the exhaust valve opening condition in the exhaust manifold. The sensing transducers will respond to these discrete pressure conditions, and the signals resulting therefrom are mixed across resistors 20, 21 and 22, and are fed via line 24 and coupling capacitor 25 to a common base transistor amplifier 26.

The amplifier 26 includes a transistor 27 and a degenerative network for preventing distortion, which network includes a current limiting resistor 28 and a bypass capacitor 29. A biasing resistor 30 is connected across the base-collector circuit of the transistor 27 and another biasing resistor 31 is connected to the collector. The amplified output pulse train is fed via line 32 and coupling capacitor 33 to a subtraction mixing resistor 34 which is connected to the base circuit of a common base transistor amplifier 36.

The amplifier 36 includes a transistor 37 having a feedback resistor 38 and a bypass capacitor 39 connected to the emitter, and a biasing resistor 40 connected to the collector. As will be discussed in more detail below, an "ideal" pulse train is also fed to the amplifier 36 and is added to the pulse train from the circuit 14 to provide an analysis output.

The circuit 16 derives pulses from the induction system of the engine, and modifies the pulses to form a reference pulse train which is compared with the pulse train from circuit 14. The circuit 16 includes a capacitive pickup member 44 which is connected to one of the spark plug terminals to provide a 20,000 volt pulse each time the respective sparkplug fires and to provide pulses each time any of the other sparkplugs fire. The pulses resulting from firing of the other sparkplugs are caused by the current induced in the line connected to the one sparkplug terminal.

Figure 3:
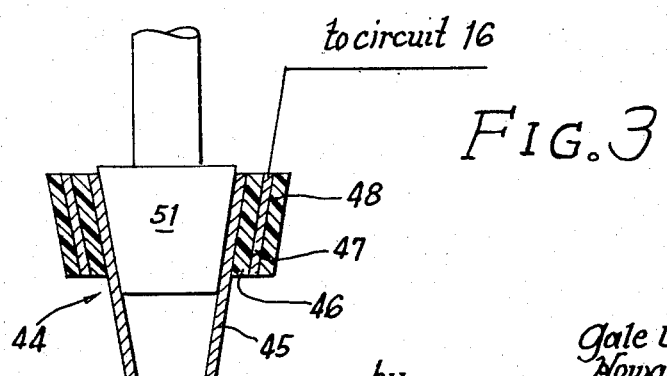
FIGURE 3 is a cross-sectional view of a distributor lead with a capacitive pickup connected thereto.

The capacitive pickup member 44 comprises a metal sleeve 45 that is connected with a friction fit to one of the conventional distributor leads 51. Referring to FIGURE 3, it can be seen that an annular ring is connected about the metal sleeve 45. The ring comprises a first plastic inner ring portion 46, an intermediate metallic foil ring 47 and an outer plastic ring 48. The metal sleeve 45 and the foil ring 47 form capacitor electrodes, the plastic ring 46 forms a capacitor dielectric and the plastic ring 48 is utilized for safety reasons.

Figure 2:
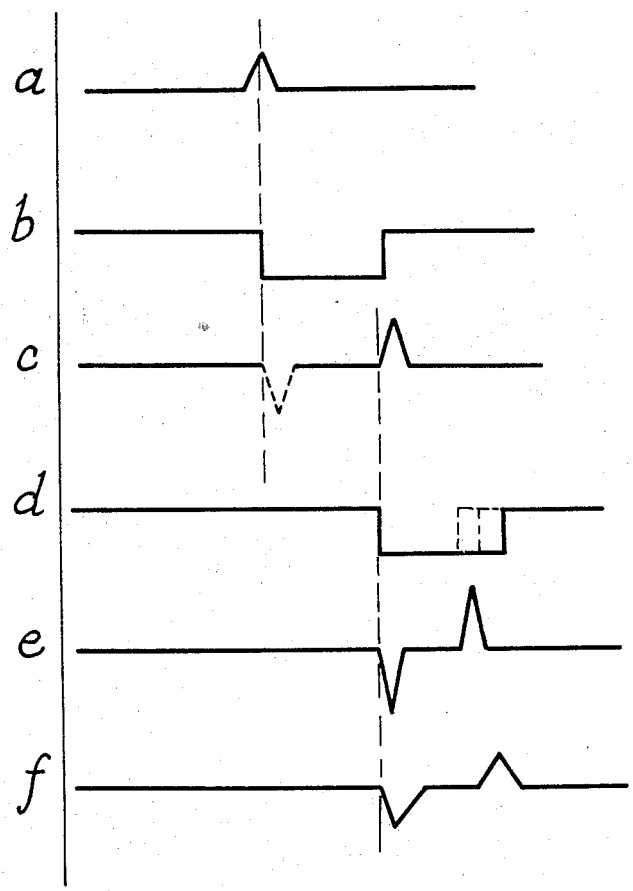
FIGURES 2a–2f are diagrams of wave forms at various points of the circuit of FIGURE 1.

The pulses picked up by member 44 are greatly attenuated by the voltage divider network including resistors 46 and 47, to avoid overdriving the first common base amplifier 48. Amplifier 48 includes a transistor 49, the base of which is connected to a potentiometer 50. Capacitor 52 and the lower portion 53 of potentiometer 50 form a network to provide a wave form as illustrated in FIGURE 2a. The upper portion 54 of the potentiometer 50 and resistor 55, which is connected to the collector of transistor 49, are bias resistors, and the emitter circuit is provided with a feedback resistor 56 and a bypass capacitor 57.

Connected to the isolation amplifier 48 is a synchronizing gate 58 which includes a unijunction transistor 59, a coupling capacitor 60, a clamping diode 61, a load resistor 62, and a synchronizing potentiometer 63 which is used to regulate the conduction of the unijunction transistor 59. The synchronizing gate 58 is utilized to shift the pulses, and the shift is accomplished in accordance with the relative values of potentiometer 63 and capacitor 60. The capacitor 60 returns the unijunction transistor 59 to its non-conducting state after firing. After the unijunction transistor 59 is fired, the wave shape will appear as shown in FIGURE 2b. This wave is differentiated by capacitor 64 and resistor 66, and the negative pulse is clipped by diode 67. The resulting wave formation is illustrated in FIGURE 2c.

An r.p.m. proportional gate 70 is utilized to set the exhaust pulses proportional to the intake pulses for the r.p.m. of the signal generated. The gate 70 includes a unijunction transistor 71, a coupling capacitor 72, a load resistor 73, a pulse position potentiometer 74 and a clipping diode 75. The output wave form is shown in FIGURE 2d.

The wave illustrated in FIGURE 2d is again differentiated and the resulting wave shape appears in FIGURE 2e. Capacitor 76 and resistor 77 form the differentiating circuit.

The pulses resulting from the differentiation are spread (at the expense of amplitude) by potentiometer 78 and capacitor 79. The resulting wave forms are shown in FIGURE 2f. The pulses are then fed to a common base amplifier 80 where the wave-form amplitude is increased so that if the engine is operating properly, the pulses from common base amplifier 80 via coupling capacitor 82 and line 83 will match in size the pulses flowing via line 32. An amplitude adjustment is provided by potentiometer 86 which is connected to the base 87 of the transistor 88. The potentiometer 86 is a portion of a voltage dividing network including a resistor 90, the potentiometer 86 and the resistor 91.

The generated pulses flowing via line 83 are fed to a subtraction resistor 92 from which they flow to the common base of transistor 37.

The resistors 34 and 92 are exactly matched and each of the pulses flowing through the resistor 34 is added to each of the pulses flowing through the resistor 92 in order to form a comparison between the pulses. The circuit 16 is set so that each pulse, with the exception of the large pulse provided by the firing of the particular spark plug to which capacitive pickup 44 is connected, should cancel the other if the system is operating properly. Such cancellation will provide a zero output, and if the system is not operating properly, a signal will result at the output to cause the actuation of a suitable indicating device. The indicating device will indicate to the operator that the internal combustion engine is operating in a defective manner.

The output indicating circuit 20 comprises a number of elements which are set so that an output signal will be indicative of voltage of a predetermined level in addition to the large pulse derived from the spark plug to which the pickup 44 is connected. The circuit 20 includes a transistor 94, across the output of which is a relay 96, the contacts 97 of which, when closed, actuate an indicating device 98. The indicating device could be an audible or a visual signal, or could comprise a voltmeter or any other device that would indicate to the operator that there is a malfunction in the system. Connected to the input of the transistor 94 is an isolation resistor 99, a bias resistor 100, a level control potentiometer 102, and a capacitor 104. A bias resistor 105 is connected to the collector of the transistor 94.

The capacitor 104 is constantly being charged by the pulses and is constantly being discharged through the resistor 100 at a rate determined by the level control potentiometer 102. The level control potentiometer is set to a position to bias the base of the transistor 94 so that the transistor will not conduct on the large pulse from the sensed spark plug terminal, but so that any voltage level above the level of the large pulse will cause the transistor to conduct, thereby actuating the relay.

In practice, the output circuit 20 is set to respond within a predetermined latitude. For example, the level control potentiometer 102 is set so that the transistor will not be conductive unless the average voltage of the pulses (other than the large pulse from the sensed spark plug terminal) is a predetermined fraction of a volt. Hence, anything less than a predetermined fraction of a volt will be considered as a substantially zero output and the engine will be considered to be operating in a satisfactory manner.

In order to set initially the circuit 16 so that a properly operating engine will cause the pulses generated by circuit 16 to cancel the pulses generated by circuit 14, an ideally operated engine is utilized as a reference engine. Transducers 10 and 12 are connected to the intake and exhaust manifolds, respectively, and pickup member 44 is connected to a selected one of the spark plug terminals. The potentiometers 53, 63, 74, 78 and 86 are adjusted so that when the engine is operating, the pulses will substantially cancel each other and the output transistor 94 will be non-conductive.

When an engine is to be tested, the pickup member 44 is connected to a selected one of the distributor terminals and the transducers 10 and 12 are connected to the intake and exhaust manifolds, respectively. A preferable connection to the manifolds includes the step of drilling a ⅜ inch hole in each of the manifolds and providing a fitting to which can be connected each of the transducers. Subsequent testing will not require further drilling of holes, because once the fittings are attached, they can be used each time a test is to be made. When the system of the present invention is connected to the operating engine under test, a defect in the engine under test will result in the actuation of relay 96, causing an output indication. If the engine is operating properly, no indicating signal will occur.

In one form of the invention, the output of amplifier 36 could be connected directly to a wave shape recorder. The shape of the output pulses could be analyzed to determine various problems or conditions in the engine. The large pulse of the sensed spark plug terminal would serve as a reference pulse so that an observer knowing the firing order of the cylinder can easily recognize from which cylinders the various pulses are derived. The pulses derived from the intake and exhaust manifolds are capable of giving a large amount of information with regard to the operation of the various cylinders of the engine.

Although an illustrative embodiment of the invention has been shown and described, it is to be understood that various substitutions and modifications may be made without departing from the spirit and novel scope of the present invention. For example, all of the PNP transistors shown could be NPN transistors if the polarity characteristics of the circuit are revised. Further, other elements, equivalent in function, may be substituted for the circuit elements illustrated.

What is claimed is:

1. A system for analyzing the condition of an internal combustion engine having a spark distribution system, an intake manifold and an exhaust manifold, comprising means for sensing the pressure pulses in one of said manifolds, means for forming an electrical analog of each of said pressure pulses, means for deriving a current pulse representative of each spark discharge from said spark distribution system, and means for comparing the electrical analog with said current pulse.

2. A system for analyzing the condition of an internal combustion engine as described in claim 1, including means for sensing the pressure pulses in the other of said manifolds and means for forming an electrical analog of each of last-mentioned pressure pulses.

3. A system for analyzing the condition of an internal combustion engine as described in claim 1 wherein each of said means for sensing the pressure pulses comprises a pressure sensitive transducer.

4. A system for indicating the condition of an internal combustion engine having an induction system, an intake manifold and an exhaust manifold, comprising means for deriving a train of current pulses from the induction system, means for deriving a train of current pulses from the intake manifold, means for deriving a train of current pulses from the exhaust manifold, and means for comparing the current pulses derived from the intake and exhaust manifolds with the current pulses derived from the induction system.

5. A system for indicating the condition of an internal combustion engine as described in claim 4, wherein each of said means for deriving a train of current pulses from said manifolds includes a pressure sensitive transducer.

6. A system for indicating the condition of an internal combustion engine during continuous operation thereof, said engine having means for producing electrical ignition signals in synchronized relation to the rate of operation of the engine and having an intake manifold and an exhaust manifold each characteristically producing discrete pressure variations corresponding to each ignition signal, said system comprising means for sensing pressure variations in one of said manifolds to produce a corresponding first electrical pulse representative of the timing and magnitude of such pressure variations; means for deriving a second electrical pulse representative of the timing of the corresponding ignition signal and having a wave form of predetermined characteristic; means for comparing said electrical pulses to produce an output representative of the engine condition; and indicating means responsive to said output.

7. A system for indicating the condition of an internal combustion engine as described in claim 6, including means for sensing pressure variations in the other of said manifolds to produce a corresponding third electrical pulse representative of the timing and magnitude of such pressure variations, both of said means for sensing pressure variations comprising a pressure sensitive transducer.

8. A system for indicating the condition of an internal combustion engine as described in claim 7, including means for mixing said first and third electrical pulses; means for amplifying the output of said mixing means; means for feeding the output of said amplifying means to said comparison means; said second electrical pulse deriving means comprising capacitive pickup means, means for shaping the pulses received by said pickup means to conform with a predetermined wave shape characteristic, means for adjusting said predetermined wave shape characteristic, and means for feeding said second electrical pulses to said comparison means.

9. A method of indicating the condition of an internal combustion engine having means for producing electrical ignition signals in synchronized relation to the rate of operation of the engine and having an intake manifold and an exhaust manifold each characteristically producing discrete pressure variations corresponding to each ignition signal, comprising the steps of deriving a first train of current pulses representative of said pressure variations from one of said manifolds; deriving a second train of pulses representative of the timing of the corresponding ignition signals, said second train of pulses simulating pulses representative of pressure variations in the respective manifold of an ideally operating engine; and comparing each of said first and second electrical pulse trains.

References Cited

UNITED STATES PATENTS

| 2,607,215 | 8/1952 | Boisblanc | 73—117.2 X |
| 2,867,766 | 1/1959 | Broder et al. | 73—117.2 X |
| 2,962,892 | 12/1960 | Weller | 73—117.2 |

RICHARD C. QUEISSER, *Primary Examiner.*

J. W. MYRACLE, *Assistant Examiner.*

U.S. Cl. X.R.

324—15